(12) United States Patent
Pryszo

(10) Patent No.: US 12,717,023 B2
(45) Date of Patent: Aug. 25, 2026

(54) RADAR APPARATUS AND METHOD FOR GENERATING RADAR IMAGES

(71) Applicant: Furuno Electric Co., Ltd., Hyogo (JP)

(72) Inventor: Iker Pryszo, Beaverton, OR (US)

(73) Assignee: Furuno Electric Co., Ltd., Nishinomiya (JP)

( * ) Notice: Subject to any disclaimer, the term of this patent is extended or adjusted under 35 U.S.C. 154(b) by 369 days.

(21) Appl. No.: 18/478,916

(22) Filed: Sep. 29, 2023

(65) Prior Publication Data

US 2025/0110233 A1 Apr. 3, 2025

(51) Int. Cl.
*G01S 13/89* (2006.01)
*G01S 7/06* (2006.01)
*G01S 13/937* (2020.01)

(52) U.S. Cl.
CPC .............. *G01S 13/89* (2013.01); *G01S 7/062* (2013.01); *G01S 13/937* (2020.01)

(58) Field of Classification Search
CPC ......... G01S 13/89; G01S 7/062; G01S 13/937
See application file for complete search history.

(56) References Cited

U.S. PATENT DOCUMENTS 7,423,581 B2 9/2008 Fujikawa et al.
9,354,303 B2 5/2016 Asada et al.
10,436,892 B2 10/2019 Fujikawa et al.
11,105,892 B2 8/2021 Fujikawa et al.
11,853,077 B1 * 12/2023 Glas .................... G05D 1/6482
2009/0067750 A1 * 3/2009 Pryszo .................. G06T 15/503 382/294
2015/0054674 A1 * 2/2015 Ballou .................. G01S 13/937 342/41
2019/0137624 A1 * 5/2019 Goto ........................ G08G 3/02
2020/0278433 A1 * 9/2020 Vanhakartano ....... G01S 13/917
2022/0374464 A1 * 11/2022 Vasnier ..................... G06F 7/14

* cited by examiner

*Primary Examiner* — William Kelleher
*Assistant Examiner* — Hailey R Le
(74) *Attorney, Agent, or Firm* — Alleman Hall LLP

(57) ABSTRACT

A RADAR apparatus and a method for generating echo images and enhancing the visibility of echo images on a display unit are disclosed. The RADAR apparatus has an antenna configured to receive echo information of a plurality of electromagnetic waves at a vessel, from a plurality of objects. The plurality of objects includes land objects, Automatic Identification Systems (AISs), and floating objects. A smart RADAR is configured to generate a display output based on the echo information, electronic chart information extracted from a storage module, and AIS information received from the AIS. The smart RADAR applies a mask to the plurality of objects in the display output, based on mask information received from a user, to identify at least one unknown object from the plurality of objects. The smart RADAR automatically applies dilation of the mask in the display output, based on a display parameter set by the user.

20 Claims, 11 Drawing Sheets

RADAR APPARATUS AND METHOD FOR GENERATING RADAR IMAGES

TECHNICAL FIELD

The present disclosure generally relates to object detection techniques and, more particularly relates, to a Radio Detecting and Ranging (RADAR) apparatus and a method for generating and enhancing the visibility of echo images (e.g., RADAR images) using different sources of data, for example, electronic chart objects, Automatic Identification System (AIS) targets, etc.

BACKGROUND

Moving bodies in a marine environment such as vessels, ships, barges, boats, etc., are typically used for transportation of people and goods among other various applications, across the globe. Apparatuses used in the detection, ranging, and monitoring, such as Radio Detecting and Ranging (RADAR), installed in on-board moving bodies or stationary monitoring stations, are used to identify moving and stationary objects in the marine environment. The stationary monitoring stations may be positioned in land area. The apparatuses transmit electromagnetic waves, sweeping the marine environment for other objects or bodies. The electromagnetic waves are reflected from one or more target objects, for example, a target ship, a vessel, or a stationary monitoring station. The reflected electromagnetic waves received by the aforementioned apparatuses are called echoes. The echoes are generally considered as signals carrying information about the target object's distance, speed, direction, location, heading, etc. Using the echo information, the location, the direction, the translational speed, etc., of the target object can be determined by the RADAR apparatuses.

A display unit in the aforementioned RADAR apparatus displays an output showing the position, direction, echo, and other information of the target objects surrounding the apparatus. However, systems and methods, in the state of the art, for generating and displaying echo, suffer from several deficiencies. For instance, it is difficult for the observer to identify unknown targets from land targets, floating objects, vessels, an Automatic Identification System (AIS), etc., on the display unit. Further, if one or more target objects are overlaying on the display output, it is difficult to identify the objects in an overlay.

Therefore, a need exists for an improved RADAR apparatus and method that can improve the visibility of target objects in the RADAR image and allow the observer to easily locate the unknow objects from the known objects.

SUMMARY

In order to solve the foregoing problem and to provide other advantages, one aspect of the present disclosure is a Radio Detecting and Ranging (RADAR) apparatus and a method for generating echo images (e.g., RADAR images) and enhancing the visibility of echo images on a display screen of the RADAR apparatus.

An advantage of various embodiments is that the Radio Detecting and Ranging (RADAR) apparatus and method can improve the visibility of target objects in the RADAR image and allow the observer to easily locate the unknow objects from the known objects. The data from different sources, for example, electronic chart objects, Automatic Identification System (AIS) targets, etc., are merged and displayed on the display screen. User can apply a mask over objects (e.g., AIS, floating objects, etc.) displayed on the display screen, leaving the unknown objects without any mask. This allows the user to easily identify unknown objects from the known objects, displayed on the display screen.

In an aspect, a method for generating RADAR images is disclosed. The method includes receiving echo information of a plurality of electromagnetic waves at a vessel installed with a RADAR apparatus, from a plurality of objects. The plurality of objects includes at least one land object, at least one AIS, and at least one floating object. The method further includes receiving AIS information from the at least one AIS. The method further includes extracting electronic chart information from a storage module. The electronic chart information is pre-stored by a user in the storage module. The method further includes receiving at least one input from the user. The input includes mask information of the plurality of objects. The method further includes generating a display output based at least on the echo information, the electronic chart information, and the AIS information. The method includes applying the mask information including at least one mask on the plurality of objects, and automatically applying dilation of the at least one mask on the display output based at least on, at least one display parameter set by the user. The method further includes displaying the display output with the at least one mask and the dilation, to identify at least one unknown object from the plurality of objects.

Yet another aspect, a RADAR apparatus for generating RADAR images is disclosed. The RADAR apparatus includes a RADAR antenna, an AIS receiver, a user interface, a display unit, and a smart RADAR including a processing module. The RADAR antenna is configured to receive echo information of a plurality of electromagnetic waves at a vessel, from a plurality of objects. The plurality of objects includes at least one land object, at least one Automatic Identification System (AIS), and at least one floating object. The AIS receiver is configured to receive AIS information from the at least one AIS. The smart RADAR is communicably coupled to the RADAR antenna and the AIS receiver, and the processing module is configured to extract electronic chart information from a storage module. The electronic chart information is pre-stored in the storage module by a user. The user interface associated with the smart RADAR is configured to receive at least one input from the user. The input includes mask information of the plurality of objects. The processing module is further configured to generate a display output based at least on the echo information, the electronic chart information, and the AIS information, apply the mask information including at least one mask on the plurality of objects on the display output, and automatically apply dilation of the at least one mask on the display output based at least on at least one display parameter set by the user. The display unit is communicably coupled to the smart RADAR, and configured to the display output with the at least one mask and the dilation, to identify at least one unknown object from the plurality of objects.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The following detailed description of illustrative embodiments is better understood when read in conjunction with the appended drawings. For the purpose of illustrating the present disclosure, exemplary constructions of the disclosure are shown in the drawings. However, the present disclosure is not limited to a specific device, or a tool and instrumentalities disclosed herein. Moreover, those skilled in the art will understand that the drawings are not to scale.

Figure 1A:
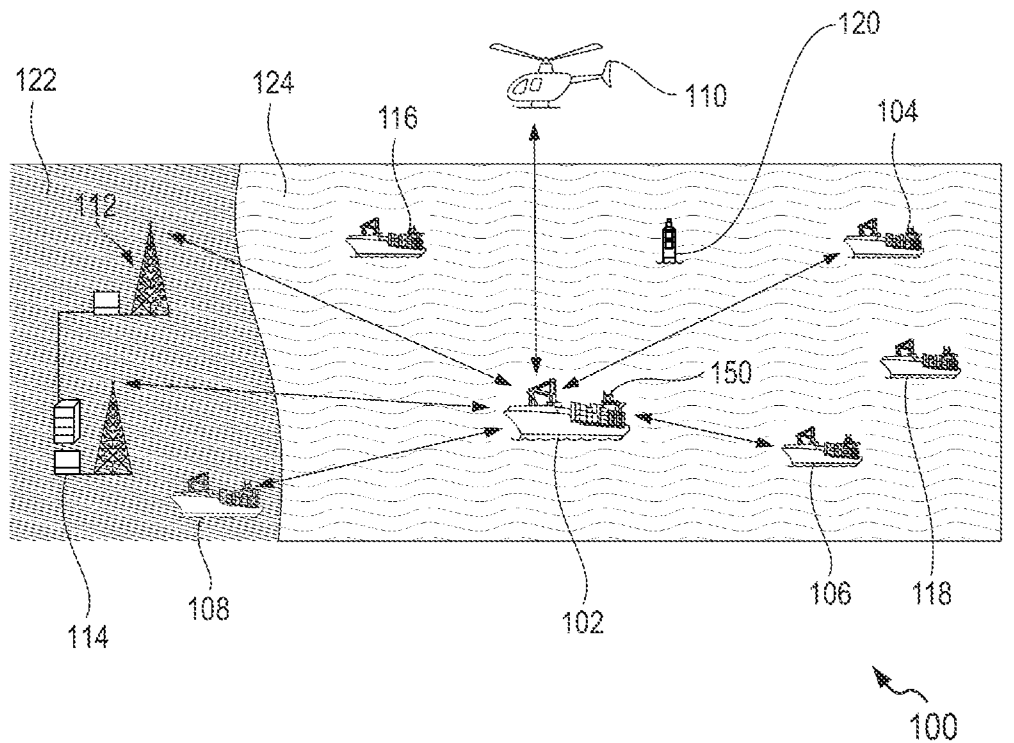
FIG. 1A illustrates an example representation of the environment related to at least some example embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments described herein. Accordingly, the examples should not be construed as limiting the scope of the embodiments herein.

Reference in this specification to "one embodiment" or "an embodiment" means that a particular feature, structure, or characteristic described in connection with the embodiment is included in at least one embodiment of the present disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores, or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing module (also referred to as and interchangeably used as "processor"). The processing module includes a software module, and the processing module is embodied as an executor of software instructions. The instructions may specifically configure the processing module to perform the algorithms and/or operations described herein when the instructions are executed.

The processing module can also be a microprocessor, but in the alternative, the processor can be a controller, microcontroller, or state machine, combinations of the same, or the like. The processor can include electrical circuitry configured to process computer-executable instructions. In another embodiment, a processor includes an Application-Specific Integrated Circuit (ASIC), a Field Programmable Gate Array (FPGA), or other programmable device that performs logic operations without processing computer-executable instructions. The processor can also be implemented as a combination of computing devices, e.g., a combination of a Digital Signal Processor (DSP) and a microprocessor, a plurality of microprocessors, one or more microprocessors in conjunction with a DSP core, or any other such configuration. Although described herein primarily with respect to digital technology, the processor may also include primarily analog components. For example, some or all of the signal processing algorithms described herein may be implemented in analog circuitry or mixed analog and digital circuitry. A computing environment can include any type of computer system, including, but not limited to, a computer system based on the microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z." unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements, or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below." "bottom," "top." "side." "higher." "lower." "upper," "over." and "under," are defined with respect to the horizontal plane.

As used herein, the terms "attached," "connected," "mated" and other such relational terms should be construed, unless otherwise noted, to include removable, moveable, fixed, adjustable, and/or releasable connections or attachments. The connections/attachments can include direct connections and/or connections having an intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately." "about," and "substantially" may refer to an amount that is within less than 10% of the stated amount. Features of embodiments disclosed herein preceded by a term such as "approximately." "about." and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

Various embodiments of the present disclosure relate to a RADAR apparatus and a method for generating RADAR images and enhancing the visibility of RADAR images on a display unit of the RADAR apparatus. The RADAR apparatus, transmits electromagnetic waves, from a vessel where the RADAR apparatus is installed. The transmitted electromagnetic waves (from RADAR apparatus), also referred to as a plurality electromagnetic waves, sweep a marine environment for other objects or bodies (also referred to as a plurality of objects). The RADAR apparatus has an antenna configured to receive echo information (i.e., waves reflected from other objects or bodies) of the plurality of electromagnetic waves at the vessel, from the plurality of objects. The plurality of objects includes but is not limited to, at least one land object, at least one Automatic Identification System (AIS), and at least one floating object (e.g., buoys, transponders, etc.). A smart RADAR in the RADAR apparatus is configured to generate a display output based on the echo information, electronic chart information (pre-stored in a storage module) extracted from the storage module, and AIS information received from the AIS. The smart RADAR applies a mask to the plurality of objects in the display output, based on mask information received from a user, to identify at least one unknown object from the plurality of objects. The smart RADAR automatically applies dilation of the mask in the display output, based on a display parameter (e.g., display range) set by the user. The present invention also allows the user to change the dilation of the mask of the plurality of objects in the display output.

The user interface is configured to receive from the user, at least one input including the mask information of the plurality of objects. The smart RADAR applies the mask information on the display output. The display unit is configured to display the display output based at least on the mask information, to identify at least one unknown object from the plurality of objects. The various embodiments of the present disclosure are described hereinafter with reference to FIG. 1A to FIG. 8.

The AIS is an automatic tracking system that uses transceivers on ships/vessels and is used by Vessel Traffic Services (VTS). AIS is configured to transmit AIS information (e.g., position) around the marine environment (from where AIS is present). The objects, ships, vessels, etc., around the AIS, receive the AIS information transmitted from AIS. AIS information received by the RADAR apparatus supplements data required for displaying the display output in the RADAR apparatus. AIS information provides essential data in the display output of the RADAR apparatus that prevents collision of the vessel with other objects in water transport. It should be noted that the AIS can act as a stationary system or can be installed on moving vessels or ships.

The floating object (e.g., buoy) is a floating device that can be anchored at a definite location to guide or warn mariners, to mark the positions of submerged objects, or to moor vessels instead of anchoring. The floating objects (e.g., buoys) are generally anchored in a body of water to mark a channel or warn of danger. The presence of floating objects indicates the presence of underwater hazards such as rocks, shoals, or shipwrecks. Buoys can also be used to mark the location of underwater pipelines, cables, and other submerged structures.

FIG. 1A illustrates an example representation of an environment 100 related to at least some example embodiments of the present disclosure. The environment 100 is for example, a marine environment 100 including one or more watercraft (e.g., a vessel) configured to sail in water bodies (e.g., sea). The marine environment 100 includes a plurality of objects 102, 104, 106, 108, and 110. The marine environment 100 also includes a communication base station 112 and a communication network station 114. The communication base station 112 and the communication network station 114 are at least wireless connections with each one of the plurality of objects 102, 104, 106, 108, 110, 116, 118, and 120. The marine environment 100 includes both land area 122, and marine area 124. In that regard, for generating echo any one of the communication base station 112, the communication network station 114, and the plurality of objects 102, 104, 106, 108, and 110 may act as an observation station and the rest of the plurality of objects 102, 104, 106, 108, 110, 116, 118, and 120 may act as the target objects. For example, if any one of the communication base stations 112 and the communication network station 114 acts as an observation station, then all of the plurality of objects 104, 106, 108, 110, 116, 118, and 120 will act as the target objects. Alternately, if anyone (for example, the vessel 102) of the plurality of objects acts as the observation station, the rest of the plurality of objects 102, 104, 106, 108, 110, 116, 118, and 120, i.e., the objects 104, 106, 108, 110, 116, 118, and 120 will act as target objects for generating echoes. However, the communication base station 112 and the communication network station 114 may not be considered to be target objects as they are envisaged to be stationary locations with respect to an inertial frame of reference. The present invention displays all the objects of the marine environment in the display unit of the RADAR apparatus so that an observer can view the current situation of the marine environment 100.

The present invention enhances the visibility of RADAR images of the plurality of objects 102, 104, 106, 108, 110, 116, 118, and 120 in the marine environment 100. The RADAR images include but are not limited to, for example, a) land area 122; b) marine area 124; c) one or more land objects, i.e., the communication base station 112, the vessel 108, and the communication network station 114; d) one or more moving objects i.e., the vessels 104, and 106 in the marine area 124; c) one or more floating objects, i.e., a buoy 120 in the marine area 124; and f) one or more AIS, i.e., the vessels 116 and 118 installed with the AIS, in the marine area 124. It should be noted that the plurality of objects 102, 104, 106, 108, 110, 116, 118, and 120 is not limited to one or more land objects, one or more floating objects, and one or more AIS, but also includes one or more aircrafts, i.e., an aircraft 110.

In that regard, the observation station (for example, the vessel 102) may be equipped with the RADAR apparatus 150. The RADAR apparatus 150 is used to identify the floating objects (e.g., the vessels 104, and 106), the stationary objects (e.g., the vessel 108 in the land area 122), the communication base station 112, the communication network station 114, vessels 116 and 118 installed with AIS, and other systems (not shown) in the marine environment 100. The RADAR apparatus 150 also identifies the aircraft 110 traveling in the air within the signal range of the RADAR apparatus 150.

The vessel 102 may be associated with the communication base station 112 and the communication network station 114. The communication base station 112 and the communication network station 114 can be communicably coupled to the vessel 102 either through wired or wireless communication. The communication base station 112 serves as a central connection point for a wireless device to communicate. The communication base station 112 has a fixed transceiver and acts as a main communication point for one or more moving objects (e.g., vessels 104, and 106), the aircraft 110, one or more stationary objects (e.g., the vessel 108), the communication base station 112, the communication network station 114, the AIS vessels 116, and 118, the floating objects (e.g., the buoy 120) and other systems (not shown) in the marine environment 100. The communication base station 112 can have one or more receive/transmit antenna, microwave dish, electronic circuitry, etc., used to handle traffic, such as cellular traffic, data traffic, signal traffic, etc. It serves as a bridge between the communication devices, and systems in the marine environment 100, such as one or more floating objects (e.g., the vessels 104, and 106), the aircraft 110, one or more stationary objects (e.g., the vessel 108), the communication base station 112, the communication network station 114, the AIS vessels 116, and 118 (i.e., the vessels 116 and 118 installed with the AIS), and other systems (not shown) in the marine environment 100.

The communication network station 114 connects the communication devices, and systems in the marine environment 100. In marine environment 100, the communication devices, and systems are installed in but not limited to one or more moving objects (e.g., the vessels 104, and 106), the aircraft 110, one or more stationary objects (e.g., the vessel 108), the communication base station 112, the communication network station 114, the AIS vessels 116, and 118, floating objects (e.g., the buoy 120) and other systems (not shown) in the marine environment 100. In one embodiment, the communication devices, and systems in the marine environment 100 include apparatuses used in the detection, ranging, and monitoring, such as RADAR, installed on-board the moving bodies or stationary monitoring stations. The communication usually happens through wireless means, such as a radio channel in telecommunications and computer networking. The communication network station 114 is used for information transfer of, for example, a digital bit stream, from one or several senders to one or several receivers. The communication network station 114 has a certain capacity for transmitting information, often measured by its bandwidth in Hz or its data rate in bits per second.

The RADAR apparatus 150 and other communication devices and systems in the marine environment 100 communicate with each other and also with the communication base station 112 using the communication network station 114. In some embodiments, the communication network station 114 acts as a Dual Function RADAR communication Base Station (DFBS). In the DFBS system, the communication base station 112 functions both as the central connection point for the wireless device to communicate and also acts as the RADAR apparatus 150, to receive echo signals reflected from the targets.

The RADAR apparatus 150 may include one or more components configured to detect target objects (either in the static or dynamic state) present within a predetermined display range of the vessel 102 (acting as the observation station) and determine one or more parameters associated with the detected the plurality of objects 104, 106, 108, 110, 116, 118, and 120. One or more parameters associated with the detected target object are not limited to position information, traveling information, direction, and velocity.

The RADAR apparatus 150 of the vessel 102 is configured to receive input from an observer (e.g., a user in the vessel 102), receives electronic chart (e.g., vector chart) information from a storage module (not shown in FIG. 1A), and AIS information from the AIS, and the echo information from the plurality of objects 104, 106, 108, 110, 116, 118, and 120. Based on the received information, the RADAR apparatus 150 generates a display output that enhances the visibility of echo images (also referred to as RADAR images) in the display output. The electronic chart information and the AIS information are used to discriminate or classify the RADAR echoes, so that the observer can focus on "unknown objects" (not shown in FIG. 1A) to increase situational awareness. The location of the objects that are not classified as land objects, the AISs, or the floating objects are highlighted in a color different from the mask color of land objects, the AISs, and the floating objects, thereby allowing the observer to easily identify the unknown or unclassified objects in the display output.

Vector charts are the most common type of electronic charts used in the marine environment 100. They provide a computer-generated representation of a chart and contain all the information required for safe navigation. Vectors are often interactive, allowing the observer to use a cursor to click on elements to obtain more information or zoom in to obtain greater detail. They also have the benefit of being able to layer information displayed in the display unit (not shown in FIG. 1A) of the RADAR apparatus 150.

In one embodiment of the invention, the vector charts are stored in a memory of a computing system, for example, a hard drive. Vector charts are database that contains a list of objects (e.g., buoys) and areas (e.g., land area, depth area). Generally, the vector charts are used to create a vector chart picture on the display unit of the RADAR apparatus 150. In the present invention, the vector charts database is used to extract some objects (e.g., land area, intertidal area, and floating objects) in the marine environment 100 and create a mask on those objects, thereby classifying, land area, floating objects, etc.

Figure 1B:
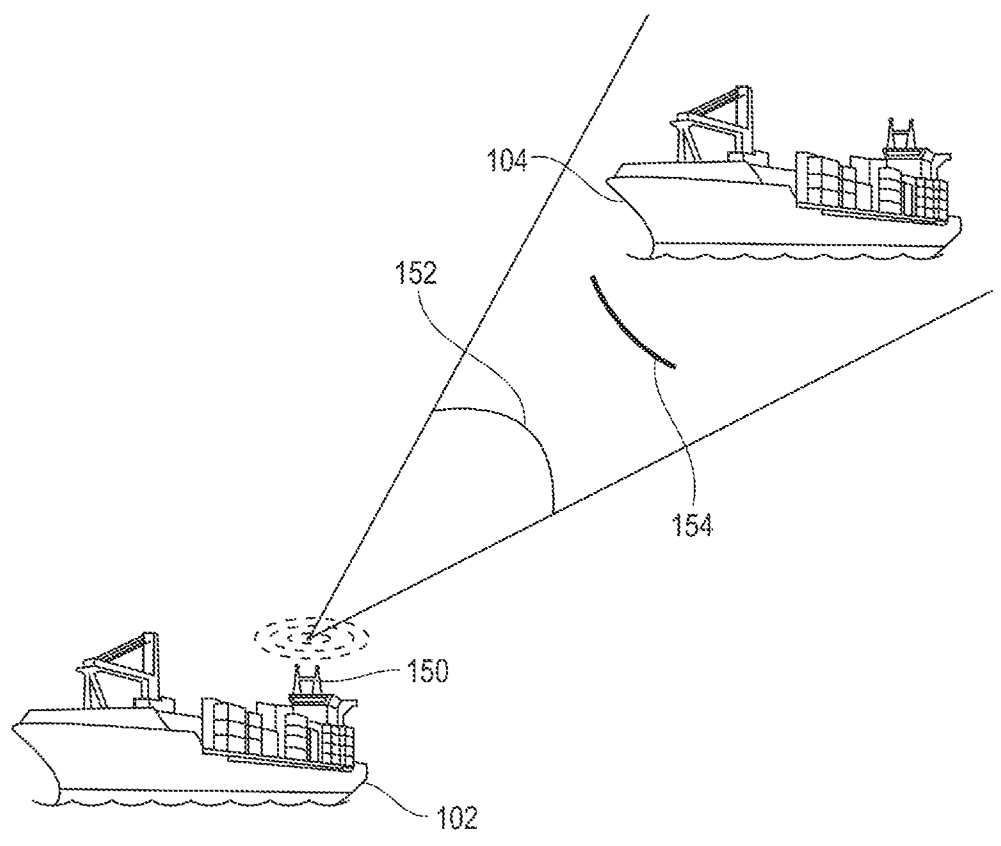
FIG. 1B illustrates another example representation of the environment of FIG. 1A related to at least some example embodiments of the present disclosure.

FIG. 1B illustrates another example representation of the marine environment 100 of FIG. 1A related to at least some example embodiments of the present disclosure. The RADAR apparatus 150 transmits the plurality of electromagnetic waves 152 through several full circle (360°) sweeps. The plurality of electromagnetic waves 152 reach the plurality of objects 104, 106, 108, 110, 116, 118, and 120 and are reflected from the plurality of objects 104, 106, 108, 110, 116, 118, and 120. The reflected waves correspond to the plurality of electromagnetic waves 152, referred to as, for example, the echoes 154 are received by the vessel 102 from the plurality of objects 104, 106, 108, 110, 116, 118, and 120.

Figure 2:
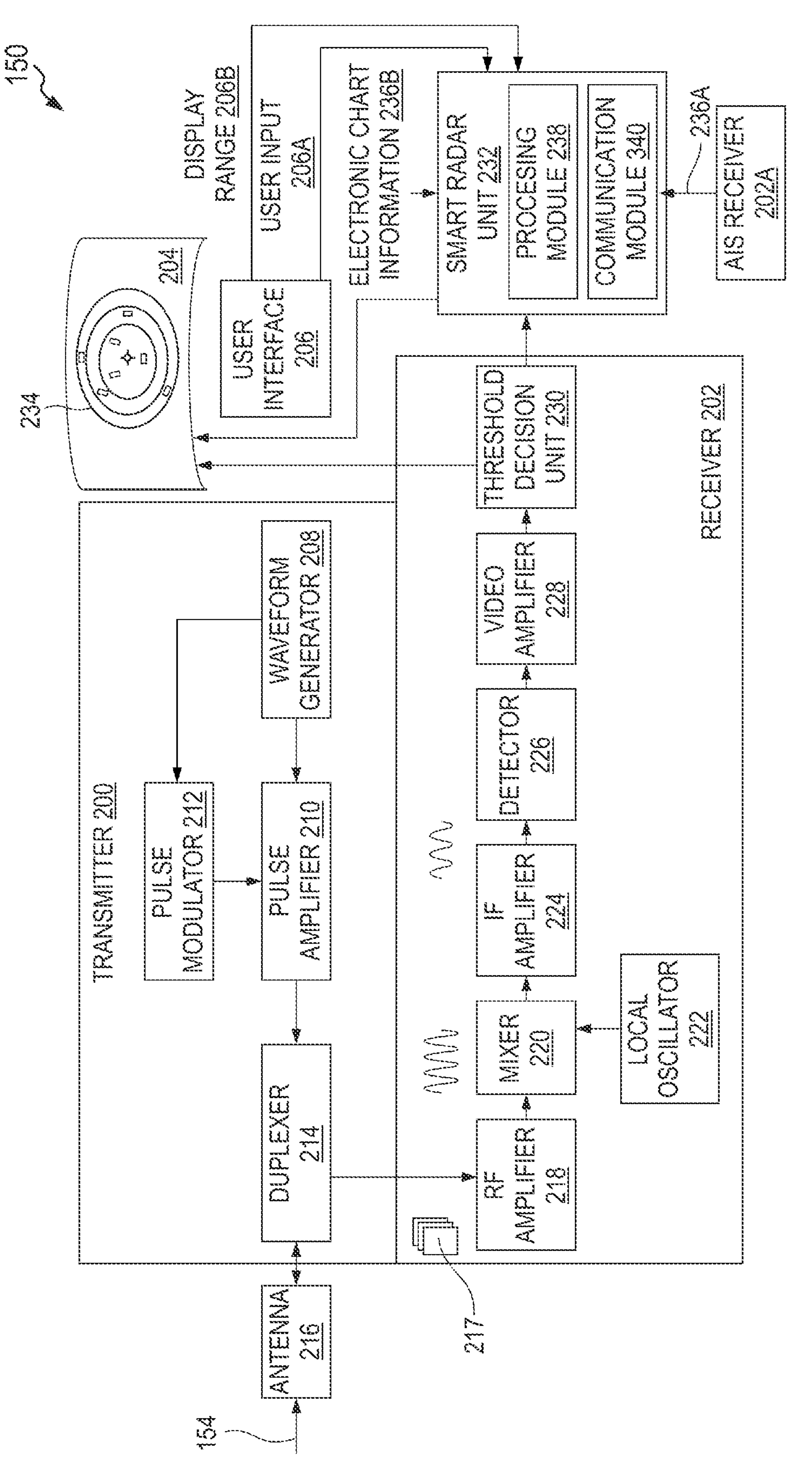
FIG. 2 illustrates a simplified block diagram of the RADAR apparatus, in accordance with an embodiment of the present disclosure.

FIG. 2 illustrates a simplified block diagram of the RADAR apparatus 150, in accordance with an embodiment of the present disclosure. It should be noted that in FIG. 1A to FIG. 8, the terms "RADAR output", "echo images", "RADAR images" and "display output" are interchangeably used in FIG. 1A to FIG. 8. The RADAR apparatus 150 has a transmitter section 200 (also referred to as a transmitter 200), a receiver section 202 (also referred to as a receiver 202), a display unit 204, and a User Interface (UI) 206. The transmitter section 200 can be one of, but not limited to a magnetron, a traveling wave tube, or a transistor amplifier.

The transmitter section 200 has a waveform generator 208 for generating low-power electromagnetic waves 152. The electromagnetic waves 152 (also referred to as a plurality of electromagnetic waves 152) are transmitted from the observation station (for example, the vessel 102) for detecting a target object, (for example, the plurality of objects 104, 106, 108, 110, 116, 118, and 120). The signal generated by the waveform generator 208 is fed to a pulse amplifier 210. In the case of a pulse RADAR, magnetrons are widely used as transmitters but whenever there exists a need for high average power then the pulse amplifier 210 can be used.

The transmitter section 200 also has a pulse modulator 212. The pulse modulator 212 turns ON and OFF the pulse amplifier 210, according to the input pulses generated by the waveform generator 208. A duplexer 214 is used to form isolation between the transmitter section 200 and the receiver section 202. The transmission of the electromagnetic waves 152 by the transmitter section 200 and reception of echoes 154 by the receiver section 202 can be done using a single antenna 216, as shown in FIG. 2. The duplexer 214 allows the use of the single antenna 216 for both transmission and reception purposes. As the transmitter section 200 and the receiver section 202 operate at different power levels, the duplexer 214 isolates the transmitter section 200 and the receiver section 202. Thus, the signal from the pulse amplifier 210 is provided to the antenna 216 through the duplexer 214.

The antenna 216 also receives the echoes 154 from the plurality of objects 104, 106, 108, 110, 116, 118, and 120. Information that can be extracted from echoes 154, referred to as echo information 217, may include locations, directions, and speeds of the plurality of objects 104, 106, 108, 110, 116, 118, and 120. Using the echo information 217, the location, direction, and speed of the plurality of objects 104, 106, 108, 110, 116, 118, and 120 can be calculated by the RADAR apparatus 150.

An example of the receiver section 202 is a superheterodyne receiver. The superheterodyne receiver is a type of radio receiver that uses frequency mixing to convert the echoes 154 to a fixed Intermediate Frequency (IF) signal which can be more conveniently processed than an original carrier frequency. The receiver section 202 has a Radio Frequency (RF) amplifier 218 (e.g., low noise RF amplifier). The RF amplifier 218 acts as the input stage for the receiver section 202. The RF amplifier 218 generates an RF pulse which is proportional to the echoes 154 of the electromagnetic waves 152. In one embodiment, the RF amplifier 218 acts at the input stage of the receiver section 202. In one another embodiment, a mixer 220 acts at the input stage by eliminating the RF amplifier 218. The mixer 220 mixes the output of the RF amplifier 218 and the output of a local oscillator 222 and the output of the mixer 220 is fed into the IF amplifier 224. In IF amplifier 224, the RF pulse received from the mixer 220 is converted into an IF signal. The IF signal generated by the mixer 220 is amplified by the IF amplifier 224. The IF amplifier 224 acts as a matched filter and increases the Signal to Noise Ratio (SNR) of the echoes 154. Also, it enhances the echo-detecting ability of the receiver section 202 by reducing the effects of unwanted signals. The bandwidth of the receiver section 202 is associated with the bandwidth of the IF amplifier 224.

The receiver section 202 also has a detector 226 (e.g., a crystal diode) to perform demodulation of the echoes 154 by separating the electromagnetic waves 152 from a carrier. A video amplifier 228 amplifies the echoes 154 to a level that can be displayed on the display unit 204. In one embodiment of the invention, the detector 226 and the video amplifier 228 are replaced with an Analog to Digital (AD) converter. The AD converter performs digital signal processing of the IF signal. A threshold decision unit 230 decides the existence of the plurality of objects 104, 106, 108, 110, 116, 118, and 120 in the marine environment 100. The threshold decision unit 230 is set with a threshold value that is compared with the magnitude of the electromagnetic waves 152. If the threshold value is surpassed by the threshold decision unit 230, then this shows the presence of the plurality of objects 104, 106, 108, 110, 116, 118, and 120. Otherwise, it is assumed that only the noise component is present in the waves received by the antenna 216.

The display unit 204 shows a display output 234 of the receiver section 202. The range and location of the plurality of objects 104, 106, 108, 110, 116, 118, and 120 are displayed on the display unit 204, by mapping it in polar coordinates. In one embodiment, the display unit 204 is implemented with a Plan Position Indicator (PPI) implemented with a Cathode Ray Tube (CRT). The display output 234 modulates the electron beam of the CRT to permit the electron beam to sweep from the center in the outward direction of the CRT. The sweep represents a rotation in synchronization with the pointing of the antenna 216.

The antenna 216 acts as a transceiver for transmitting electromagnetic waves 152 around the vessel 102. The antenna 216 also receives the echoes 154 from the plurality of objects 104, 106, 108, 110, 116, 118, and 120. The RADAR apparatus 150 processes the received echoes 154 and sends the echo information 217 (e.g., location, direction, speed of target object), to the display unit 204 in the form of echo images. The RADAR apparatus 150 also has the UI 206 for allowing a user to input display parameters. The display parameters are not limited to display range, pulse width, etc. In one embodiment, the UI 206 allows the user to change the display range to an arbitrary value, or a predefined value.

The RADAR apparatus 150 processes the received echoes 154 of a currently-set display range and generates a plurality of potential echo for each of the plurality of objects 104, 106, 108, 110, 116, 118, and 120. It should be noted that the plurality of potential echo also includes the echoes of unknown objects in the marine environment 100.

The user (i.e., the observer) can select using the UI 206 a display range from a plurality of display ranges. Based on the display parameter (i.e., a display range 206B) set by the user, the display output 234 of the plurality of objects 104, 106, 108, 110, 116, 118, and 120 is adjusted in the display unit 204. The plurality of display ranges is a set of display ranges that can be configured using the RADAR apparatus 150. An example of the plurality of display range is not limited to, the plurality of display ranges, such as 1 NM, 1.5 NM, 2 NM, and 3 NM. Based on the selected display range, the display output 234 (e.g., echo) of the targeted object is displayed on the display unit 204.

Initially, based on the display range set by the user, the dilation of the land area and the plurality of objects 104, 106, 108, 110, 116, 118, and 120 are automatically applied by a smart RADAR 232 on the display output 234. The observer using the UI 206 can select at least, mask information, dilation offset information, and intertidal information, and the selected option (i.e., a user input 206A, also referred to as "at least one input" or "input" from the observer) is applied to the display output 234. This enhances the visibility of the display output 234 (i.e., RADAR images). The dilation offset information represents the amount of mask (i.e., a color) laid over the echo.

Figure 4A:
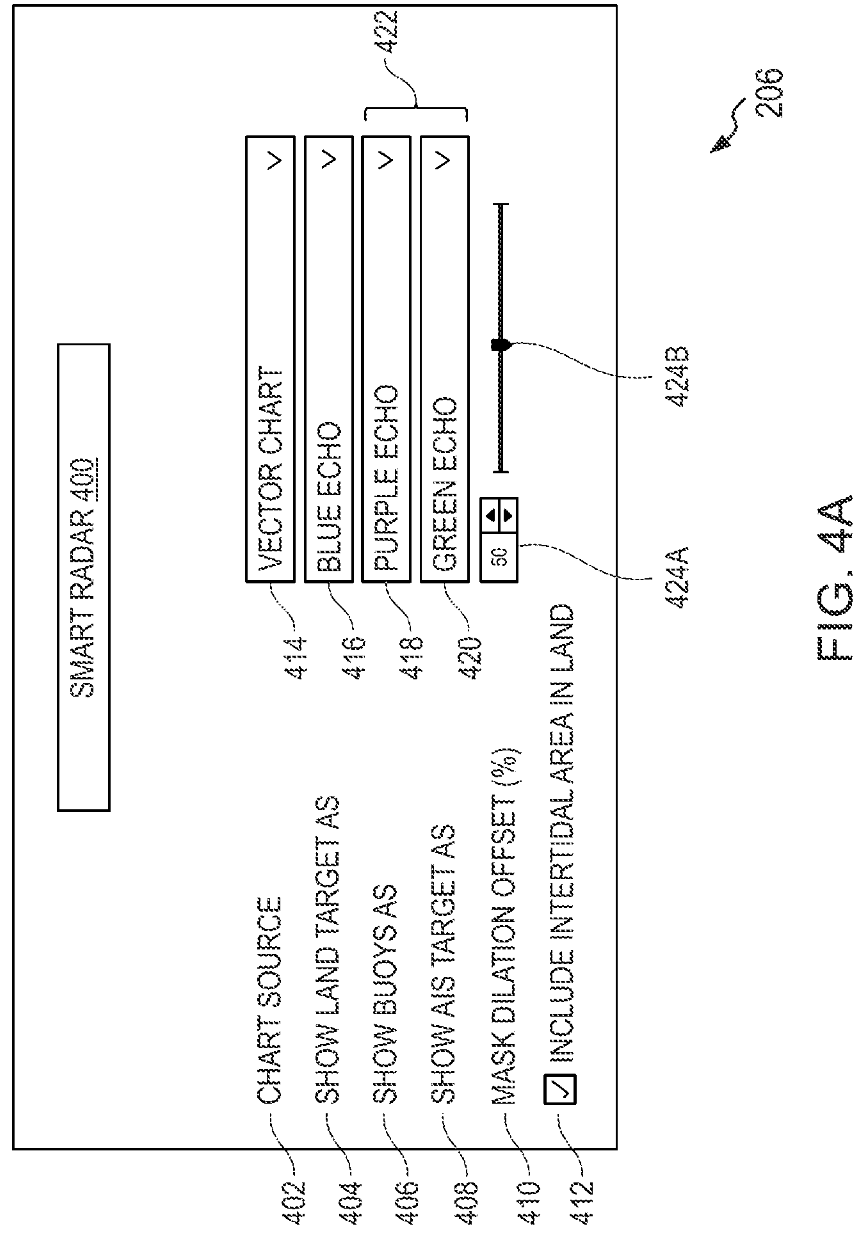
FIG. 4A illustrates an example representation of a user interface of the RADAR apparatus of FIG. 2 showing smart RADAR option, related to at least some example embodiments of the present disclosure.
Figure 4B:
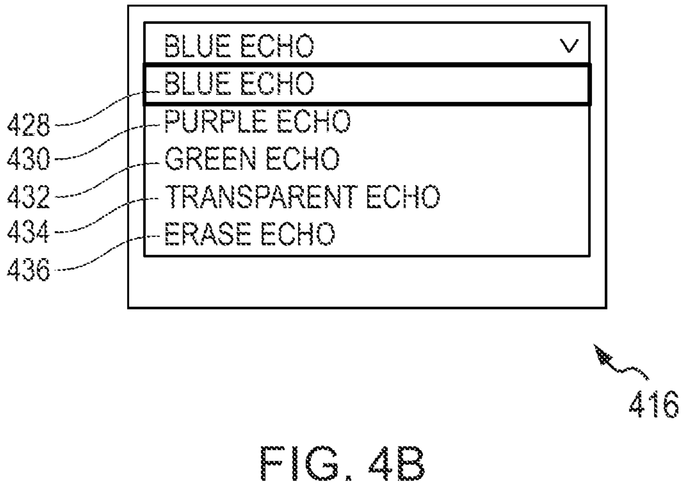
FIG. 4B illustrates an example representation of the user interface of the smart RADAR option, showing various options for land area related to at least some example embodiments of the present disclosure.
Figure 4C:
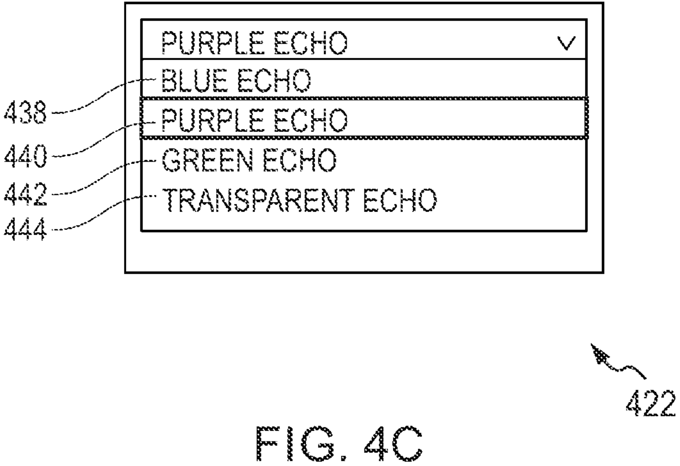
FIG. 4C illustrates an example representation of the user interface of the smart RADAR option, showing various options for floating objects and AIS objects, related to at least some example embodiments of the present disclosure.
Figure 5:
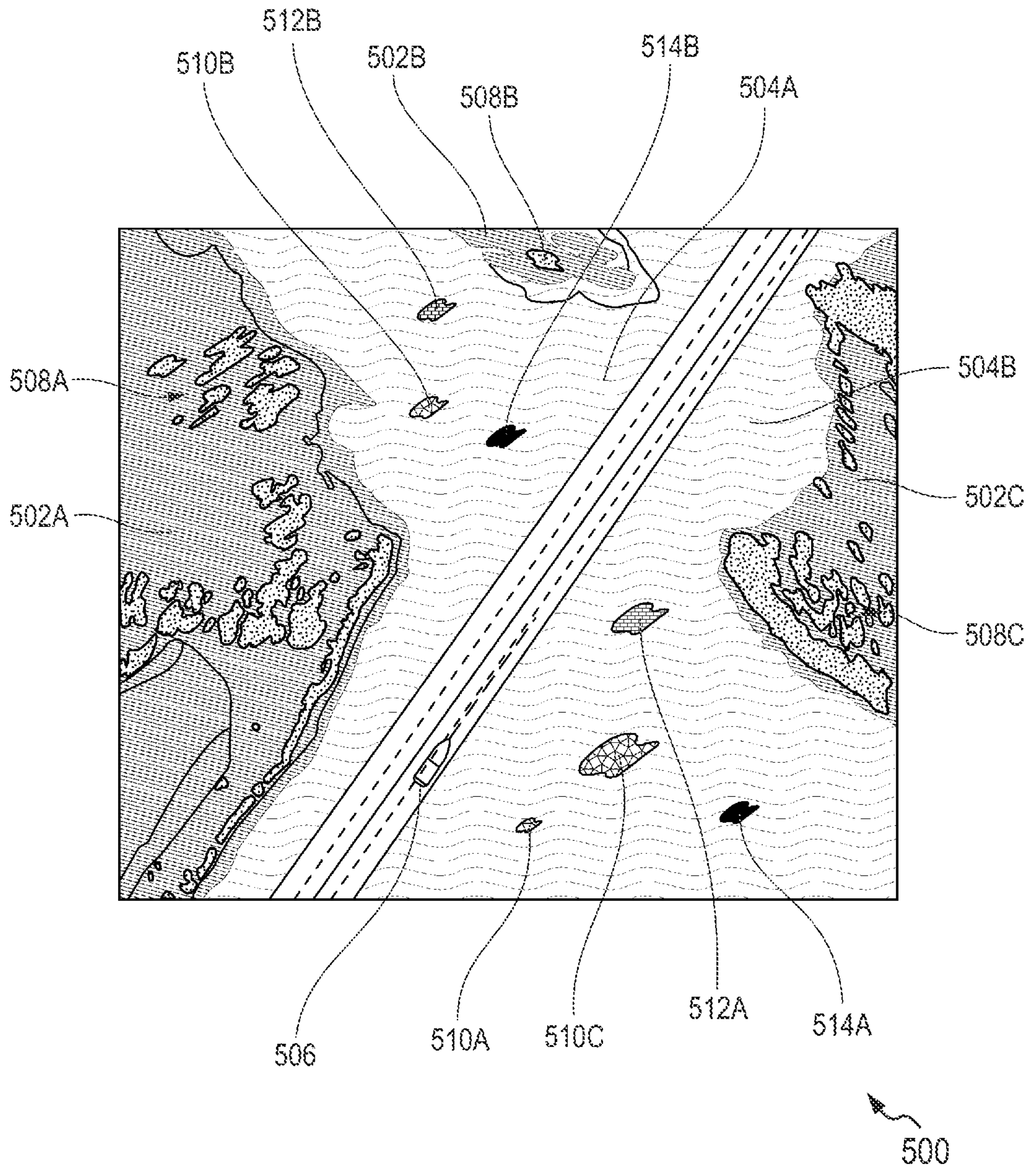
FIG. 5 illustrates an example representation of a display output of the RADAR apparatus, applied with mask information and dilation offset information, in accordance with an embodiment of the present disclosure.
Figure 6A:
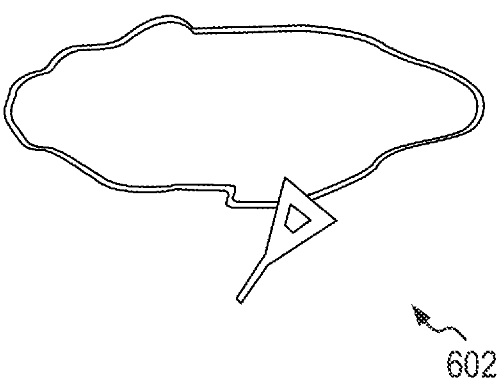
FIG. 6A illustrates an example representation of an echo of one of a plurality of objects displayed on the display unit without applying the mask information and the dilation offset information, in accordance with an embodiment of the present disclosure.
Figure 6B:
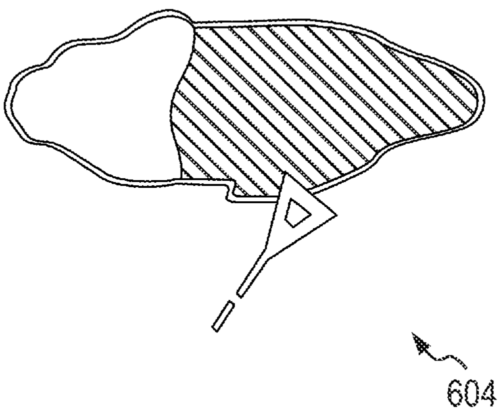
FIG. 6B illustrates an example representation of the echo of FIG. 6A displayed on the display unit by applying the mask information and partially applying the dilation offset information, in accordance with an embodiment of the present disclosure.
Figure 6C:
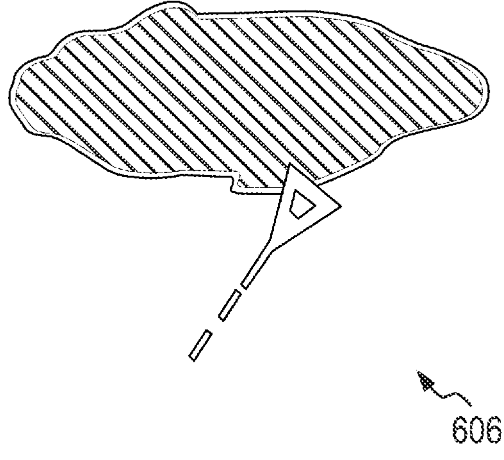
FIG. 6C illustrates an example representation of the echo of FIG. 6A displayed on the display unit by applying the mask information and fully applying the dilation offset information, in accordance with an embodiment of the present disclosure.

In one embodiment of the invention, the mask information includes at least one mask on the plurality of objects 104, 106, 108, 110, 116, 118, and 120. The smart RADAR 232 automatically applies dilation of the mask on the display output 204 based at least on the display range 206B set by the observer. Another embodiment of the invention allows the observer to input the dilation offset information (e.g., the user input 206A), using the UI 206. The existing dilation of the land area and the plurality of objects are changed by the RADAR apparatus 150 based on the dilation offset information. FIG. 4A to FIG. 4C illustrate the various options available to the observer to select the mask information, the dilation offset information, and the intertidal information, FIG. 5 illustrates the display output 234 applied with mask information, while FIG. 6A to 6C illustrates an echo displayed on the display unit 204 with various dilation offset information based on observer selection in the UI 206.

In one embodiment of the invention, the smart RADAR 232 generates a plurality of processed echo information (also referred to as "RADAR images", and "display output"), from the received echo information 217. The observer can select enhanced display options by selecting a "Smart RADAR" option in the UI 206. In one embodiment of the invention, the smart RADAR 232 generates the plurality of processed echo information, based on the mask information (i.e. mask color for each object), and dilation information (e.g., radius of floating objects and AIS, and dilation of the land area) selected by the observer. The plurality of objects 104, 106, 108, 110, 116, 118, and 120 includes but is not limited to the land object, the AIS, and the floating object.

In one embodiment of the invention, the smart RADAR 232 generates a plurality of processed echo information, from the received echo information 217. The observer can select enhanced display options by selecting a "Smart RADAR" in the UI 206. In one embodiment of the invention, the smart RADAR 232 generates the plurality of processed echo information, based on the mask information (e.g., mask color) for the land area 122 selected by the observer.

In another embodiment of the invention, the smart RADAR 232 generates the plurality of processed echo information based on the mask information (e.g., mask color), dilation offset information (e.g., radius of floating objects and AIS, and dilation of the land area) for each of the plurality of objects 104, 106, 108, 110, 116, 118, and 120, selected by the observer. In another embodiment of the invention, the smart RADAR 232 generates the plurality of processed echo information for the land objects, based on the mask information (e.g., mask color), dilation offset, erase information (i.e. to remove the land area 122 from the display output 234), selected by the observer.

In one embodiment of the invention, the observer can select whether the intertidal area should be included in the land area 122 or not. The smart RADAR 232 generates the plurality of processed echo information based on the mask information (e.g., mask color), dilation offset information (e.g., radius of floating objects and AIS, and dilation of the land area) for each of the plurality of objects 104, 106, 108, 110, 116, 118, and 120, and intertidal information, selected by the observer. In another embodiment of the invention, the smart RADAR 232 generates the plurality of processed echo information for the land objects, based on the mask information (e.g., mask color), dilation offset information (e.g., radius of floating objects and AIS, and dilation of the land area), erase information (i.e. to remove the land area 122 from the display output 234) and the intertidal information, selected by the observer.

The RADAR apparatus 150 is configured to locate the plurality of objects 104, 106, 108, 110, 116, 118, and 120 present within the predetermined area of the vessel 102 based on receipt of the reflected electromagnetic waves (e.g., echoes 154) being intercepted by the target vessels (e.g., the vessels 104, 106, 108, and 110). Moreover, the RADAR apparatus 150 is configured to determine the coordinates of the plurality of objects 104, 106, 108, 110, 116, 118, and 120 and the distance between the vessel 102 and each of the plurality of objects 104, 106, 108, 110, 116, 118, and 120. The distance between the vessel 102 and the plurality of objects 104, 106, 108, 110, 116, 118, and 120 is computed based on the time measured between the transmission of the electromagnetic waves 152 and receipt of the echoes 154. From the received echoes 154, echo information 217 such as locations, directions, and speeds of the plurality of objects 104, 106, 108, 110, 116, 118, and 120 can be extracted by the RADAR apparatus 150. More specifically, the smart RADAR 232 is capable of processing the echoes 154 and extracting locations, directions, and speeds of the plurality of objects 104, 106, 108, 110, 116, 118, and 120 from the echoes 154.

In one embodiment of the invention, an AIS receiver 202A of the RADAR apparatus 150 is configured to receive AIS information 236A from the AIS (e.g., vessels 116, and 118). The smart RADAR 232 receives the AIS information 236A from the AIS receiver 202A and electronic chart information 236B from a storage module (not shown in FIG. 2). The observer can set at least one display parameter (e.g., display range) of the RADAR apparatus 150. In some embodiments of the invention, the display range can be set to a default value and the same can be changed by the observer using the UI 206. The smart RADAR 232 also receives from the UI 206, the display parameter (e.g., display range) set by the observer. As shown in FIG. 2, the smart RADAR includes a processing module 238, and a communication module 240. The processing module 238 performs various processing of the smart RADAR 232 for generating RADAR images with enhanced display output. The UI 204 communicates with the smart RADAR 232 through the communication module 240. The various elements of the smart RADAR 232 and its working are explained in FIG. 3A.

In one embodiment of the invention, the smart RADAR 232 merges at least the echo information 217, the electronic chart information 236B, and the AIS information 236A and generates the processed echo information (e.g., display output 234). The mask information, the dilation offset information, and the intertidal information selected by the observer is applied to the display output 234. This creates an enhanced display of RADAR images on the display unit 204 and the observer can easily differentiate the unknown object from the plurality of objects 104, 106, 108, 110, 116, 118, and 120. It should be noted that the mask information, the dilation offset information, and the intertidal information selected by the observer, together represent the user input 206A.

In one embodiment of the invention, the display output 234 creates a mask color on the plurality of objects 104, 106, 108, 110, 116, 118, and 120 displayed on the display unit 204. In one embodiment of the invention, the display output 234 is automatically set with the dilation of mask color of the plurality of objects 104, 106, 108, 110, 116, 118, and 120 and the dilation of the land area, based on the display range 206B (pre-defined or set by the user) of the RADAR apparatus 150.

Figure 3A:
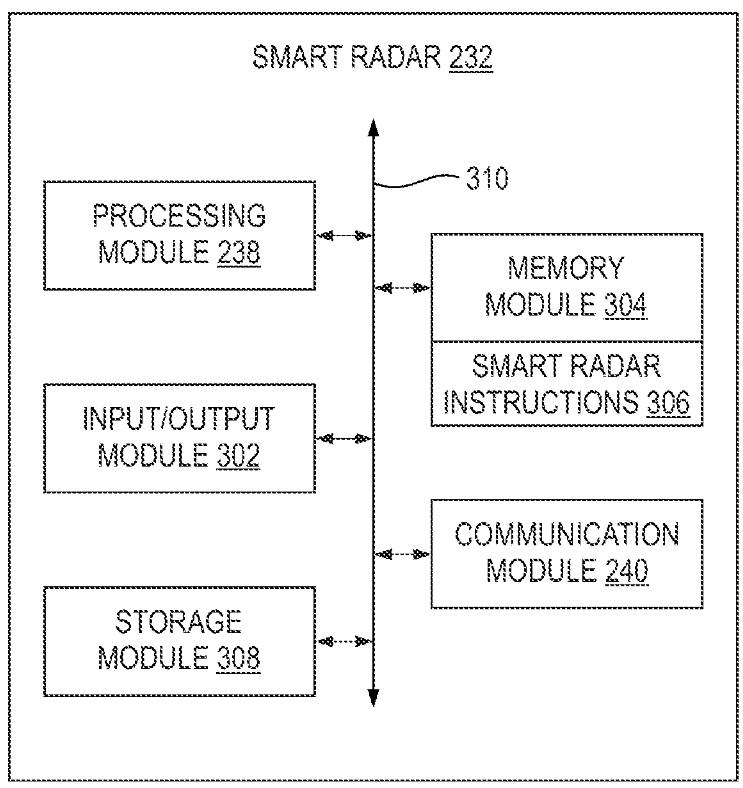
FIG. 3A illustrates a simplified block diagram of a smart RADAR of the RADAR apparatus of FIG. 2, in accordance with an embodiment of the present disclosure.

FIG. 3A illustrates a simplified block diagram of the smart RADAR 232 of the RADAR apparatus 150, in accordance with an embodiment of the present disclosure. The smart RADAR 232 has the processing module 238, the communication module 240, an input/output module 302, a memory module 304 with smart RADAR instructions 306, and a storage module 308.

In an embodiment, the memory module 304 is capable of storing machine-executable instructions, also referred to as the smart RADAR instructions 306. Further, the processing module 238 is capable of executing the stored machine-executable instructions. In an embodiment, the processing module 238 may be embodied as a multi-core processor, a single-core processor, or a combination of one or more multi-core processors and one or more single-core processors. For example, the processing module 238 may be embodied as one or more of various processing devices, such as a coprocessor, a microprocessor, a controller, a digital signal processor (DSP), a processing module with or without an accompanying DSP, or various other processing devices including integrated circuits such as an Application Specific Integrated Circuit (ASIC), a Field Programmable Gate Array (FPGA), a microcontroller unit (MCU), a hardware accelerator, a special-purpose computer chip, or the like. In an embodiment, the processing module 238 may be configured to execute hard-coded functionality. In an embodiment, the processing module 238 is embodied as an executor of software instructions, wherein the instructions may specifically configure the processing module 238 to perform the algorithms and/or operations described herein when the instructions are executed.

The processing module 238 may include one or more sub-modules, for example, the land mask sub-module, the floating objects mask sub-module, the AIS mask sub-module, and the dilation sub-module. Such sub-modules of the processing module 238 may be implemented as software modules, hardware modules, firmware modules, or as a combination thereof.

The memory module 304 may be embodied as one or more volatile memory devices, one or more non-volatile memory devices, and/or a combination of one or more volatile memory devices and non-volatile memory devices. For example, the memory module 304 may be embodied as magnetic storage devices (such as hard disk drives, floppy disks, magnetic tapes, etc.), optical magnetic storage devices (e.g., magneto-optical disks), CD-ROM (compact disc read-only memory), CD-R (compact disc recordable), CD-R/W (compact disc rewritable), DVD (Digital Versatile Disc), BD (Blu-ray® Disc), and semiconductor memories (such as mask ROM, PROM (programmable ROM), EPROM (erasable PROM), flash ROM, RAM (random access memory), etc.).

Thus, upon receiving the user input 206A from the user, the processing module 238 merges the echo information 217, the electronic chart information 236B, and the AIS information 236A and generates the processed echo information (e.g., display output 234). The mask information, the dilation offset information, and the intertidal information selected by the observer are applied to the display output 234. This creates an enhanced display of RADAR images on the display unit 204. The observer can easily differentiate the unknown object from the plurality of objects 104, 106, 108, 110, 116, 118, and 120.

In at least some embodiments, the memory module 304 stores logic and/or instructions (e.g., smart RADAR instruction 306), which may be used by sub-modules of the processing module 238 to: (1) extract electronic chart information 236B from the storage module 308; (2) process and generate the display output 234 based at least on the echo information, the electronic chart information, and the AIS information; (3) automatically apply dilation of the at least one mask on the display output 234 based at least on at least one display parameter set by the user; (4) apply the mask information including at least one mask on the plurality of objects 104, 106, 108, 110, 116, 118, and 120; and (5) generate the display output 234 based at least on the dilation offset information received from the user interface 206.

The I/O module 302 is configured to facilitate the provisioning of the display output 234 to an operator of the smart RADAR 232. The I/O module 302 is configured to be in communication with the processing module 238 and the memory module 304. Examples of the I/O module 302 include but are not limited to, an input interface and/or an output interface. Examples of the input interface may include, but are not limited to, a keyboard, a mouse, a joystick, a keypad, a touch screen, soft keys, a microphone, and the like. Examples of the output interface may include but are not limited to, a display such as a light-emitting diode display, a Thin-Film Transistor (TFT) display, a liquid crystal display, an Active-Matrix Organic Light-Emitting Diode (AMOLED) display, a microphone, a speaker, a ringer, a vibrator, and the like.

In an example embodiment, the processing module 238 may include I/O circuitry configured to control at least some functions of one or more elements of the I/O module 302, such as, for example, a speaker, a microphone, a display, and/or the like. The processing module 238 and/or the I/O circuitry may be configured to control one or more functions of the one or more elements of the I/O module 302 through computer program instructions, for example, software and/or firmware, stored on a memory, for example, the memory module 304, and/or the like, accessible to the processing module 238.

The communication module 240 may include communication circuitry such as transceiver circuitry including an antenna and other communication media interfaces to connect to a communication network. The communication circuitry may, in at least some example embodiments enable the reception of signal or information from the other vessels (in land or, stations, aircraft, etc., via a communication network.

The storage module 308 is any computer-operated hardware suitable for storing and/or retrieving data. In one embodiment, the storage module 308 includes a repository, which is configured to the electronic chart information 236B. As such, the repository may serve as the database of various charts that can be used to classify land area and floating objects. The storage module 308 may include multiple storage units such as hard drives and/or solid-state drives in a Redundant Array of Inexpensive Disks (RAID) configuration. In some embodiments, the storage module 308 may include a Storage Area Network (SAN) and/or a Network Attached Storage (NAS) system. In one embodiment, the storage module 308 may correspond to a distributed storage system, wherein individual databases are configured to store charts from different sources, such as vector charts, navigational charts, etc.

In some embodiments, the processing module 238 and/or other components of the smart RADAR 232 may access the storage module 308 using a storage interface (not shown in FIG. 3A). The storage interface may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processing module 238 and/or the modules of the processing module 238 with access to the storage module 308.

The various components of the smart RADAR 232, such as the processing module 238, the memory module 304, the I/O module 302, the communication module 240, and the storage module 308 are configured to communicate with each other via or through a centralized circuit system 310. The centralized circuit system 310 may be various devices configured to, among other things, provide or enable communication between the components of the smart RADAR 232. In certain embodiments, the centralized circuit system 310 may be a central Printed Circuit Board (PCB) such as a motherboard, a main board, a system board, or a logic board.

The centralized circuit system 310 may also, or alternatively, include other Printed Circuit Assemblies (PCAs) or communication channel media.

In at least one example embodiment, the communication module 240 is configured to receive the echo information 217 from the receiver 202, and at least one information from the observer. The information from the observer is obtained by selecting at least one option (e.g., at least one input, the user input 206A) from various options displayed in the UI 206 of the RADAR apparatus 150. The information is not limited to the mask information of the plurality of objects 104, 106, 108, 110, 116, 118, and 120 and the dilation offset information of the land area and the plurality of objects 104, 106, 108, 110, 116, 118, and 120, and the intertidal information of the land objects. The mask information refers to applying a specific color selected by the observer to the echo of that particular object (i.e., the land objects, the floating objects, or the AIS) in the display output 234. The processing module 238 through the communication module 240 extracts the electronic chart information 236B from the storage module 308. The communication module 240 is further configured to receive the AIS information 236A from the AIS receiver 202. The user can set or change the display range of the RADAR apparatus 150 and the same is received by the processing module 238 through the communication module 240. The processing module 238 receives information from the communication module 240 and processes the information to generate display output 234.

Figure 3B:
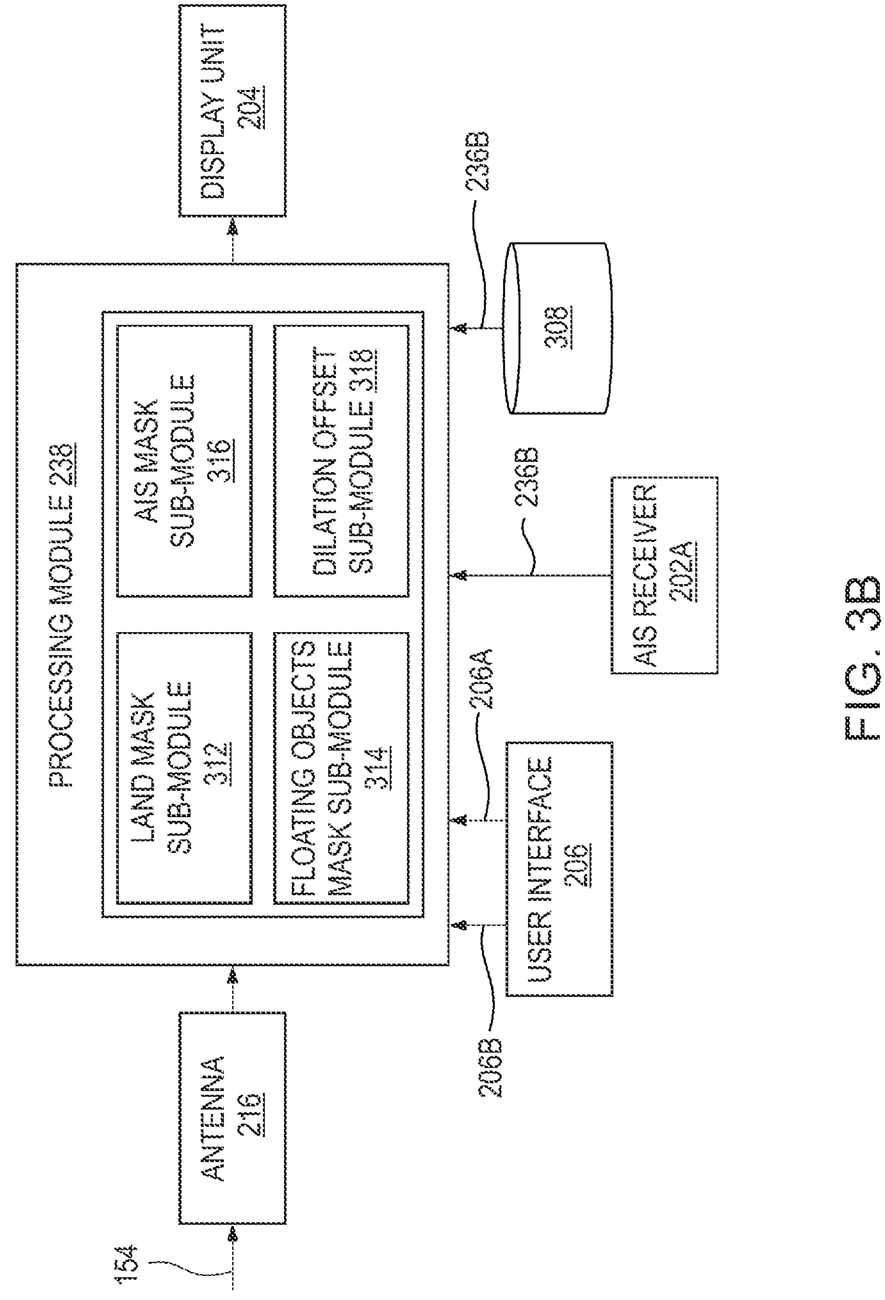
FIG. 3B illustrates a simplified block diagram of a processing module of the smart RADAR of FIG. 3A, in accordance with an embodiment of the present disclosure.

FIG. 3B illustrates a simplified block diagram of the processing module 238 of RADAR apparatus 150 of FIG. 2, in accordance with an embodiment of the present disclosure. The processing module 238 has a land mask sub-module 312, a floating objects mask sub-module 314, an AIS mask sub-module 316, and a dilation offset sub-module 318.

The antenna 216 received the echoes 154 from the plurality of objects 104, 106, 108, 110, 116, 118, and 120. The smart RADAR 232 receives echo information 217 from the antenna 216, and at least one information from the observer. The information from the observer is obtained by selecting at least one option (e.g., at least one input, the user input 206A) from various options displayed in the UI 206 of the RADAR apparatus 150. The information is not limited to the mask information of the plurality of objects 104, 106, 108, 110, 116, 118, and 120 and the dilation offset information of the land area and the plurality of objects 104, 106, 108, 110, 116, 118, and 120, and the intertidal information of the land objects. The mask information refers to applying a specific color selected by the observer to the echo of that particular object (i.e., the land objects, the floating objects, or the AIS).

The smart RADAR 232 also receives the AIS information 236A from the AIS (e.g., the vessels 116, 118) and the electronic chart information 236B from the storage module 308. It should be noted that in one embodiment of the invention, the electronic chart information 236B and the AIS information 236A are merged and stored in the storage module 308. The storage module 308 is configured to store the electronic chart information 236B including but not limited to vector charts, navigational charts, interactive charts, etc. Each information, for example, the electronic chart information 236B, the AIS information 236A, the echo information 154, etc., represents a source of information that can be displayed in the display output 234. In one embodiment of the invention, the observer can select or change the source of information to be displayed using the UI 206.

In one embodiment of the invention, the observer can also set a pulse width from a plurality of pulse widths, using the UI 206 over which the plurality of objects 102, 104, 106, 108, 110, 116, 118, and 120 needs to be monitored. The pulse width refers to a time period between the leading and trailing edges of a single pulse of energy. In one embodiment of the invention, the observer can also set a display range from a plurality of display ranges, using the UI 206 over which the target object needs to be monitored. Based on the newly set display range or pulse width, the echoes of the plurality of objects 102, 104, 106, 108, 110, 116, 118, and 120 are displayed on the display unit 204.

In another embodiment of the invention, the observer can select enhanced display options by selecting "Smart RADAR" option (not shown in FIG. 2) in the UI 206. The observer can input the mask information for the land objects to be displayed in the display output 234. Based on the mask information selected by the observer, the land mask sub-module 312 processes the received information and applies the selected the mask information on the display output 234, and the same is displayed to the observer on the display unit 204. This creates a mask (e.g., blue color mask) on the echoes of the land objects.

In another embodiment of the invention, the observer can select enhanced display options by selecting "Smart RADAR" option in the UI 206. The observer can input the mask information for the floating objects to be displayed in the display output 234. Based on the mask information selected by the observer, the floating objects mask sub-module 314 processes the received information and applies the selected the mask information on the display output 234, and the same is displayed to the observer on the display unit 204. This creates a mask (e.g., purple color mask) on the echoes of the floating objects.

In another embodiment of the invention, the observer can select enhanced display options by selecting "Smart RADAR" option in the UI 206. The observer can input the mask information for the AIS objects to be displayed in the display output 234. Based on the mask information selected by the observer, the AIS mask sub-module 316 processes the received information and applies the selected the mask information on the display output 234, and the same is displayed to the observer on the display unit 204. This creates a mask (e.g., green color mask) on the echoes of the AIS objects.

In yet another embodiment of the invention, the observer can select enhanced display options by selecting a "Smart RADAR" option in the UI 206. The observer can input the dilation offset information for the plurality of objects (e.g., the land object) to be displayed in the display output 234. Based on the dilation offset information selected by the observer, the dilation offset sub-module 318 processes the received information and applies the selected the dilation offset information on the display output 234, and the same is displayed to the observer on the display unit 204. In the case of land objects, the objects are represented in, for example, an oval shape, the change in dilation offset information selected by the observer expands the echo of the land objects in both the horizontal and vertical directions.

In yet another embodiment of the invention, the observer can select enhanced display options by selecting a "Smart RADAR" option in the UI 206. The observer can input the dilation offset information for the plurality of objects (e.g., the floating object. AIS) to be displayed in a display output 234. Based on the dilation offset information selected by the observer, the dilation offset sub-module 318 processes the received information and applies the selected the dilation offset information on the display output 234, and the same is displayed to the observer on the display unit 204. In the case of the floating objects and the AIS, the objects are represented in a circular shape, the change in dilation offset information selected by the observer changes the radius of the circular shape.

In yet another embodiment of the invention, the observer can select enhanced display options by selecting a "Smart RADAR" option in the UI 206. The observer can input the intertidal information to be displayed in the display output 234. Based on the intertidal information selected by the observer, the smart RADAR 232 applies the selected option on the display output 234, and the same is displayed to the observer on the display unit 204. The intertidal information indicates whether the intertidal areas need to be included as land or not in the display output 234.

FIG. 4A illustrates an example representation of the UI 206 of the RADAR apparatus 150 of FIG. 2 related to at least some example embodiments of the present disclosure. The observer can select a "Smart RADAR" option 400 in the UI 206. In one embodiment of the invention, the UI 206 and the display unit 204 are independent units, and any selection by the observer in the UI 206 will be sent to the smart RADAR 232. The smart RADAR 232 processes the information received from the UI 206 and displays the display output 234 representing the RADAR images, based on the information from the UI 206. The observer using the UI 206 can select at least, the mask information, the dilation offset information, and the intertidal information, and the selected option is applied to the display output 234.

In one embodiment of the invention, the UI 206 and the display unit 204 are integrated. In this case, the UI 206 is displayed on the display unit 204, e.g., a touch screen. The observer can select options from the UI 206 and the selected information (i.e., the selected option) can be sent to the smart RADAR 232. The smart RADAR 232 processes the information received from the UI 206 and displays the display output 234 representing the RADAR images, based on the option selected by the observer from the UI 206. It should be noted that the mask information includes first mask information representing the land object, second mask information representing the AIS, and third mask information representing the floating object.

To obtain enhanced visibility of RADAR images, the UI 206 displays various fields and options to the observer. The various fields that are displayed in the UI 206 are not limited to, "Chart Source" 402, "Show Land Target As" 404, "Show Buoys As" 406, "Show AIS Target As" 408, and "Mask Dilation Offset (%)" 410. The user can select or check "Include Intertidal Area In Land" 412 to include the intertidal area as a part of the land area 122. The user can uncheck "Include Intertidal Area In Land" 412 to exclude the intertidal area as a part of the land area 122.

The observer can select one source (e.g., "Vector Chart" 414) from a list of sources (e.g., electronic chart information 236B) that are retrieved from the storage module 308. Based on the selected "Chart Source" 402 (e.g., "Vector Chart" 414), the data used for processing and displaying on the display unit 204 can be changed.

A various options 416 (also called attributes) represents the options available for the field "Show Land Target As" 404", a various options 418 represents the options available for the field "Show Buoys As" 406", and various options 420 represents the options available for the field "Show AIS Target As" 408. The various options 416 for selecting the field "Show Land Target As" 404" are shown in FIG. 4B. The various options 422 (e.g., various options 418 and 420) for selecting the field "Show Buoys As" 406 and "Show AIS Target As" 408 are shown in FIG. 4C.

As shown in FIG. 4B, the various options 416 for selecting the field "Show Land Target As" 404" are not limited to "Blue Echo" 428, "Purple Echo" 430, "Green Echo" 432, "Transparent Echo" 434, and "Erase Echo" 436. As shown in the FIG. 4A, the observer has selected the option "Blue Echo" 428. The first mask information includes at least one of first color information, first transparent information, and erase information of the land object displayed in the display output 234. The first color information is not limited to at least one of "Blue Echo" 428, "Purple Echo" 430, and "Green Echo" 432. The first transparent information is not limited to the "Transparent Echo" 434, and the erase information is not limited to the "Erase Echo" 436.

As shown in FIG. 4C, the various options 422 (also called attributes) for selecting the fields "Show Buoys As" 406 and "Show AIS Target As" 408 are not limited to "Blue Echo" 438, "Purple Echo" 440, "Green Echo" 442, and "Transparent Echo" 444. As shown in the FIG. 4C, the observer has selected the option "Purple Echo" 440 (e.g., for the fields "Show Buoys As" 406). It should be noted that unlike the various options 416 in the fields "Show Buoys As" 406, the "Show AIS Target As" 408 does not have the option "Erase Echo" 436.

The second mask information includes at least one of second color information, and second transparent information of the floating object displayed in the display output 234. The second color information is not limited to at least one of "Blue Echo" 438, "Purple Echo" 440, and "Green Echo" 442. The second transparent information is not limited to the "Transparent Echo" 444.

The third mask information includes at least one of third color information, and third transparent information of the AIS object displayed in the display output 234. The third color information is not limited to at least one of "Blue Echo" 438, "Purple Echo" 440, and "Green Echo" 442. The third transparent information is not limited to the "Transparent Echo" 444.

Depending on the option the respective fields (e.g., "Show Land Target As" 404, "Show Buoys As" 406, "Show AIS Target As" 408) will be assigned with respective color or attribute. For example, when the observer selects the various options 416 for "Show Land Target As" 404 as "Blue Echo" 428, all the land echoes in the display output 234 will change to blue color. When the observer selects the various options 416 for "Show Land Target As" 404 as "Purple Echo" 430, all the land echoes in the display output 234 will change to purple color. When the observer selects the various options 416 for "Show Land Target As" 404 as "Transparent Echo" 434, all the land echoes in the display output 234 will take the original color or dimmed, without any masking or coloring. When the observer selects the various options 416 for "Show Land Target As" 404 as "Erase Echo" 436, all the land echoes in the display output 234 will be erased and the display output 234 will only have echoes of one or more buoys and one or more AIS.

Similarly, when the observer selects the various options 422 for "Show Buoys As" 406 as "Blue Echo" 438, all the buoy echoes in the display output 234 will change to blue color. When the observer selects the various options 422 for "Show Buoys As" 406 as "Purple Echo" 440, all the buoys echoes in the display output 234 will change to Purple color. When the observer selects the various options 422 for "Show Buoys As" 406 as "Transparent Echo" 444, all the floating object echoes in the display output 234 will take the original color or dimmed, without any masking.

Similarly, when the observer selects the various options 422 for "Show AIS Target As" 408 as "Blue Echo" 438, all the land echoes in the display output 234 will change to blue color. When the observer selects the various options 422 for "Show AIS Target As" 408 as "Purple Echo" 440, all the land echoes in the display output 234 will change to Purple color. When the observer selects the various options 422 for "Show AIS Target As" 408 as "Transparent Echo" 444, all the AIS echoes in the display output 234 will take the original color or dimmed, without any masking.

It should be noted that the various options 416, 418, and 420 represent the mask information that is to be applied on the display output 234. In one embodiment of the invention, the processing module 238 automatically adjusts the dilation of the land area and the plurality of objects 104, 106, 108, 110, 116, 118, and 120, based on the display range set by the observer. The observer can either choose the percentage of "Mask Dilation Offset (%)" 410 from a dropdown button 424A or can use a slider 424B to choose the various levels of dilation to be applied to the land objects. In another embodiment of the invention, the dilation of the land area and the plurality of objects 104, 106, 108, 110, 116, 118, and 120 can be adjusted by the observer by selecting the percentage of "Mask Dilation Offset (%)" 410 from the dropdown button 424A or can use the slider 424B for choosing the various levels of dilation to be applied to the land area and the plurality of objects 104, 106, 108, 110, 116, 118, and 120. The variation of dilation of an echo of a land area is explained in FIG. 6A to FIG. 6C.

The present invention uses the electronic chart information 236B and the AIS information 236A (see FIG. 2 and FIG. 3B) to discriminate the echoes in the display output 234 so that the operator (e.g., observer) can focus on "unknown objects" to increase situational awareness. Using the present invention, the observer can dim (increase transparency), and/or erase (land only), and/or change the color palette for the echoes caused by land, floating buoy/beacon, and AIS objects, so that "uncharted/unknown" echo is more visible. The "unknown objects" are not limited to non-AIS targets, uncharted obstructions, and so on. The observer can also enable/disable the "Smart Radar" option 400 in the display output. Thus, the present invention allows the operator to access or modify one or more options in the various options 416 and 422 on the UI 206 and accordingly based on the selection made by the observer on the UI 206, masks (i.e., colors, patterns, etc.) are applied on the display output 234.

Further, the present invention creates land masks on the echoes in the land area 122 using the electronic chart information 236B. The invention also allows the observer to select to include or exclude the intertidal area (e.g., "Include Intertidal Area In Land" 412) (by default the intertidal area is included) from the RADAR images. The present invention also shows the AISs and the floating objects in the display output 234. The AIS information 236A is received from the AISs (e.g., vessel 116 installed with AIS in FIG. 1A) around the RADAR apparatus 150.

FIG. 5 illustrates an example representation of a display output 500 displayed on the display unit 204 and applied with the mask information and the dilation offset information, in accordance with an embodiment of the present disclosure. The display output 500 shows land area (e.g., land areas 502A, 502B, and 502C) and sea area (e.g., 504A, and 504B). The land areas 502A, 502B, and 502C have one or more land objects that are under observation. It should be noted in FIG. 5, that the echoes of the plurality objects are only shown and the plurality objects are omitted for brevity. The RADAR apparatus 150 transmits the electromagnetic waves (e.g., electromagnetic waves) around the vessel 506 where the RADAR apparatus 150 is installed. The echoes (e.g., echoes 508A, 508B, and 508C) represent the electromagnetic waves reflected by the one or more land objects. The echoes (e.g., echoes 510A, 510B, and 510C) represent the electromagnetic waves reflected by the one or more floating objects (e.g., buoys). The echoes (e.g., echoes 512A, and 512B) represent the electromagnetic waves reflected by the one or more AISs.

Based on the user selected marking information, for example, the mask information for each field, "Show Land Target As" 404, "Show Buoys As" 406, and "Show AIS Target As" 408, the display output 500 will be displayed on the display unit 204. The "unknown objects" (e.g., objects 514A, and 514B) are shown in a different color (e.g., red color mask) compared to the colors selected by the observer in "Show Land Target As" 404 (e.g., blue color mask), "Show Buoys As" 406 (e.g., purple color mask), and "Show AIS Target As" 408 (e.g., green color mask). This enhances the visual representation of the RADAR images (e.g., the display output 500) displayed to the observer, so that the observer can easily identify the unknown objects 514A, and 514B.

In one embodiment of the invention, the dilation is applied to the land areas 502A, 502B, and 502C and to the land objects (e.g., echoes 508A, 508B, and 508C), the AISs (e.g., echoes 512A, and 512B) and the floating objects (e.g., echoes 510A, 510B, and 510C). The dilation of land areas 502A, 502B, and 502C includes applying dilation in a vertical direction and then applying dilation in a horizontal direction, according to the display range preset or changed by the user. The dilation of the land objects (e.g., echoes 508A, 508B, and 508C), the AISs (e.g., echoes 512A, and 512B) and the floating objects (e.g., echoes 510A, 510B, and 510C) include adjusting the radius of the shape (e.g., circular shape) of each object according to the display range preset or changed by the user.

FIG. 6A illustrates an example representation of an echo 602 of one of the plurality of objects (e.g., echoes 508A, 508B, and 508C of land objects) displayed on the display unit 204 by applying the mask information and not applying the dilation offset information, in accordance with an embodiment of the present disclosure. FIG. 6B illustrates an example representation of the echo 604 of FIG. 6A displayed on the display unit 204 by applying the mask information and partially applying the dilation offset information, in accordance with an embodiment of the present disclosure. FIG. 6C illustrates an example representation of the echo 606 of FIG. 6B displayed on the display unit 204 by applying the mask information and fully applying the dilation offset information, in accordance with an embodiment of the present disclosure.

For example, in one embodiment of the invention, the processing module 238 automatically adjusts the dilation of the land objects based on the display range set by the observer. In another embodiment of the invention, the observer can adjust the dilation of the land objects by selecting the percentage of "Mask Dilation Offset (%)" 410 from the dropdown button 424A. In another embodiment of the invention, the observer can use the slider 424B to choose the various levels of dilation to be applied to the objects (e.g., the land objects).

In one embodiment of the invention, as the echoes are larger than the underlying objects in the display output 234, using the present invention, the observer can apply the dilation on the echoes of the land objects and circular masks on the echoes of the floating and AIS objects. It should be noted that the percentage of dilation and the radius of the circular mask depends on the display range selected by the observer on the display unit 204.

The dilation and radius of the circle get bigger as the display range of the RADAR apparatus 150 increases. For example, the maximum value of dilation will be at the display range of 3 NM and the minimum value of dilation will be at the display range of 0.25 NM. The below Table-A provides the dilation or radius of the circle, at various display ranges in the display output 234 of the RADAR apparatus 150.

TABLE-A

| DISPLAY RANGE | DILATION |
|---|---|
| 3 NM and above | 300 m |
| 2 NM | 200 m |
| 1.5 NM | 150 m |
| 1 NM | 100 m |
| 0.75 | 75 m |
| 0.5 NM | 50 m |
| 0.25 and below | 25 m |

User can input dilation offset information using the UI 206 and the existing dilation on the display out can be changed as per the user selected dilation offset information. It should be noted that initially, the dilation of the land mask and the plurality of objects 104, 106, 108, 110, 116, 118, and 120 are set by the smart RADAR 232, based on the display range set in the RADAR apparatus 150. The present invention uses the slider 424B to allow the observer to make some adjustments according to the size of the antenna 216. The slider 424B (e.g., range of −50% to 100%) is available with the option to alter the overall dilation/circle radius. It should be noted that the observer with a large radar antenna 216, may want to reduce the overall dilation, and the observer with a small dome may want to increase dilation.

As shown in FIG. 4B to FIG. 4C, individual masking options for the echoes of land objects, floating objects, and AIS can be made by the observer. Thus, for the echoes of land objects, floating objects, and AIS, a separate mask (e.g., land mask, floating mask, and AIS mask) is created on the display output 234. Further, the observer can set the transparency, for example, if the transparency is set to 60%, the echo will be very faint. In case of overlapping between the land mask, AIS mask, and the floating object mask, the land mask wins and its features are displayed in the display output 234. It should be noted that transparency will make the mask dim while the erase will totally remove the echoes of the land objects. In one embodiment of the invention, the overlapping objects may be displayed in a color different from the land mask, floating mask, and AIS mask. In another embodiment of the invention, the overlapping objects may be displayed in a color that is a combination of colors of overlapping mask colors.

Figures 7A, 7B, 7C:
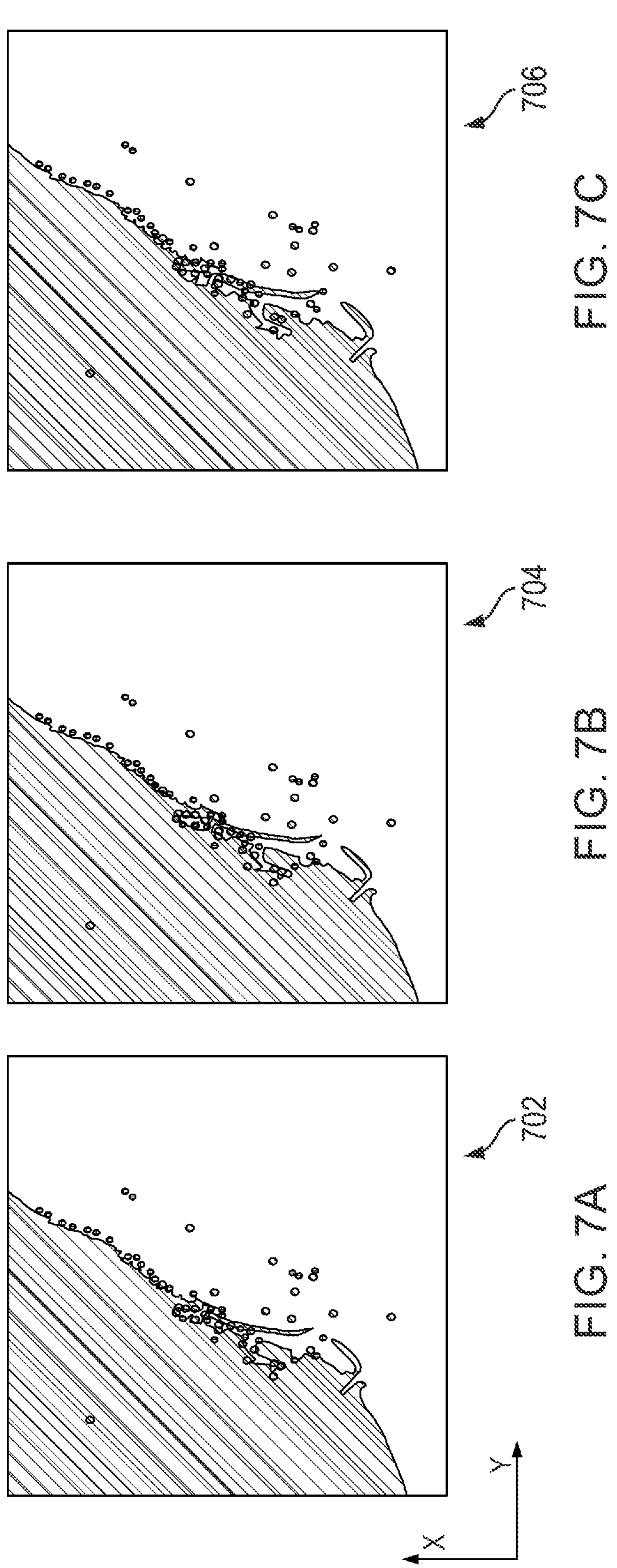
FIG. 7A illustrates an example representation of the display unit obtained by applying the mask information and not applying the dilation offset information, in accordance with an embodiment of the present disclosure.
FIG. 7B illustrates an example representation of the display unit obtained by applying the dilation offset information vertically, in accordance with an embodiment of the present disclosure.
FIG. 7C illustrates an example representation of the display unit obtained by applying the dilation offset information horizontally, in accordance with an embodiment of the present disclosure.

FIG. 7A illustrates an example representation of the display output 702 showing dilation based on the display range, in accordance with an embodiment of the present disclosure. FIG. 7B illustrates an example representation of a display output 704. The display output 704 is obtained when the display output 702 of FIG. 7A is vertically applied with the dilation offset information received from the user. FIG. 7C illustrates an example representation of a display output 706. The display output 706 is obtained when the display output 704 of FIG. 7B is further horizontally applied with the dilation offset information received from the user, in accordance with an embodiment of the present disclosure. It should be noted that the FIG. 7B and FIG. 7C, dilation offset information is applied only to the land area, while the dilation offset information is not applied to the plurality of objects 104, 106, 108, 110, 116, 118, and 120. In one embodiment of the invention, the user can either include land area in the display output 234 or exclude the same from the display output 234.

In one embodiment of the invention, the dilation offset sub-module 318 performs dilation of land area (including intertidal area) by adding pixels to the land area. More specifically, the land area in the display output (e.g., the display output 702 shown in FIG. 7A) is first added with pixels in a vertical direction (X), as shown in FIG. 7B. Then, the land area in the display output (e.g., the display output 704 shown in FIG. 7B) is added with pixels in a horizontal direction (Y) as shown in FIG. 7C. Thus, compared to the display output 702 as shown in FIG. 7A, the land area (with the intertidal area) is dilated both in the vertical direction (X) and the horizontal direction (Y), thereby the land area is clearly visible after dilation. The dilation can be initially performed based on the display range of the RADAR apparatus. The user can adjust the dilation of the land area and the plurality objects 104, 106, 108, 110, 116, 118, and 120, by selecting the "Mask dilation offset (%)" 410 or adjusting the slider 424B, in the user interface 206 as depicted in FIG. 4A.

As shown in FIG. 7A, the floating objects and the AISs are circular in shape and are indicated using the mask information selected by the observer. In case the land area is erased by the observer by selecting "Erase Echo" 436 option, the display output 702 includes only echoes of the floating objects and the AISs indicated in circular shapes with different colors. In some embodiments of the invention, the land objects include floating objects and the AISs, hence the floating objects and the AISs are displayed in the display output without land area. In case the land area is not erased by the observer by unselecting the "Erase Echo" 436 option, the display output 702 includes echoes of all the objects, for example, the land objects, the floating objects, and the AISs. The floating objects and the AISs are indicated in circular shapes with different colors. A different color (colors other than the color of the floating objects and the AISs), is used on the echoes of objects intersecting each other on the display output 702.

To increase the visibility of echoes of land objects, the dilation is applied using the "Mask dilation offset (%)" 410 or the slider 424B depicted in FIG. 4A. The dilation is applied to the echoes of land objects. Initially, the processing module 238 applies dilation vertically, thereby enlarging the display output 702 vertically. Vertically dilated display output 704 is shown in FIG. 7B. The processing module 238 then applies dilation horizontally, thereby enlarging the display output 704 horizontally. Horizontally dilated display output 706 is shown in FIG. 7C.

Figure 8:
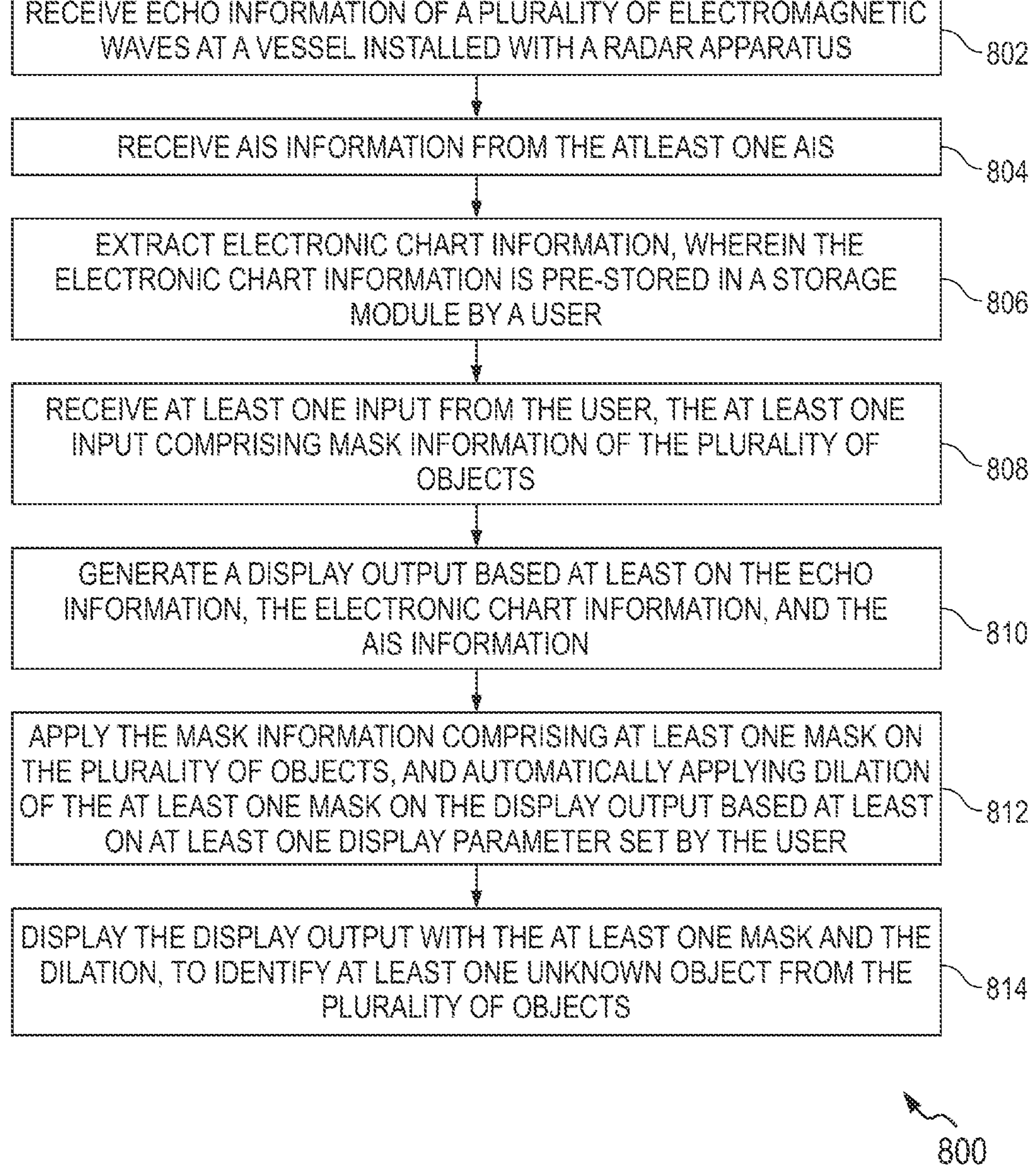
FIG. 8 illustrates a flow diagram of a method for enhancing the visibility of RADAR images, in accordance with an embodiment of the present disclosure.

FIG. 8 illustrates a flow diagram of a method 800 for enhancing the visibility of RADAR images displayed as display output 234, in accordance with an embodiment of the present disclosure. The method 800 depicted in the flow diagram may be executed by, for example, the RADAR apparatus 150 explained with reference to FIG. 1A to FIG. 7C. Operations of the flowchart, and combinations of operation in the flowchart, may be implemented by, for example, hardware, firmware, a processor, circuitry and/or a different device associated with the execution of software that includes one or more computer program instructions. The operations of the method 800 are described herein with the help of the RADAR apparatus 150. It is noted that the operations of the method 800 can be described and/or practiced by using a system other than the RADAR apparatus 150. The method 800 starts at operation 802.

At step 802, the RADAR apparatus 150 transmits the electromagnetic waves, sweeping the marine environment 100 for other objects or bodies (e.g., the plurality of objects 104, 106, 108, 110, 116, 118, and 120). The electromagnetic waves are reflected from the plurality of objects 104, 106, 108, 110, 116, 118, and 120, for example, the land objects, the floating objects, and the AISs. The antenna 216 of the RADAR apparatus 150 receives the echo information of the plurality of electromagnetic waves at the vessel 102, from a plurality of objects 104, 106, 108, 110, 116, 118, and 120.

At step 804, the RADAR apparatus 150 also has the AIS receiver 202A to receive the AIS information from the AIS objects.

At step 806, a smart RADAR 232 associated with the antenna 216 and the AIS receiver 202A, is configured to extract the electronic chart information 236B from the storage module 308. The observer (e.g., the user of RADAR apparatus) pre-stores the electronic chart 236B information (e.g., vector chart information, navigational chart information, etc.,) in the storage module 308. Based on the electronic chart information 236B selected by the observer, the smart RADAR 232 extracts the electronic chart information 236B from the storage module 308.

At step 808, the user interface 206 associated with the smart RADAR 232 receives at least one input from the observer (e.g., the user). The input includes the mask information of the plurality of objects 104, 106, 108, 110, 116, 118, and 120 in the display output 234.

At step 810, the smart RADAR 232 generates the display output 234 based at least on the echo information 154, electronic chart information 236B, and the AIS information 236A.

At step 812, the smart RADAR 232 of the RADAR apparatus 150 applies the mask information including at least one mask on the plurality of objects in the display output 234. The smart RADAR 232 automatically applies dilation of the at least one mask on the display output based at least on at least one display parameter set by the user.

At step 814, the display unit 204 of the RADAR apparatus 150 displays the display output 234 with the mask and the dilation, to identify unknown objects from the plurality of objects 104, 106, 108, 110, 116, 118, and 120.

It should be noted that the land area, the intertidal area, the floating objects information, etc., can be obtained from the electronic chart information stored in the storage module 308 and the same can be used by the processing module 238. The observer can select using the UI 206 at least, the mask information, the dilation offset information, and intertidal information, and the selected options are applied to the display output 234. This enhances the visibility of RADAR images (i.e., display output 234) and easily differentiates "unknown objects" from known objects.

As described above, the present invention is not limited to the embodiment described above, and it is of course possible for those skilled in the art to make various modifications.

What is claimed is:

1. A method of generating echo images, the method comprising:

receiving echo information of a plurality of electromagnetic waves at a vessel installed with a Radio Detecting and Ranging (RADAR) apparatus, from a plurality of objects, wherein the plurality of objects comprises at least one land object, at least one Automatic Identification System (AIS), and at least one floating object;

receiving AIS information from the at least one AIS;

extracting electronic chart information from a storage module, wherein the electronic chart information is pre-stored in the storage module by a user;

receiving at least one input from the user, the at least one input comprising mask information of the plurality of objects;

generating a display output based at least on the echo information, the electronic chart information, and the AIS information;

applying the mask information comprising at least one mask on the plurality of objects, and automatically applying dilation of the at least one mask on the display output based at least on, at least one display parameter set by the user; and displaying the display output with the at least one mask and the dilation, to identify at least one unknown object from the plurality of objects.

2. The method of claim 1, wherein receiving the mask information comprises accepting at least one of:

first mask information representing the at least one land object;

second mask information representing the at least one AIS; and third mask information representing the at least one floating object.

3. The method of claim 2 wherein the first mask information comprises first color information, first transparent information, and erase information of the at least one land object displayed in the display output.

4. The method of claim 2 wherein the second mask information comprises second color information, and second transparent information of the at least one AIS displayed in the display output.

5. The method of claim 2, wherein the third mask information comprises third color information, and third transparent information of the at least one floating object displayed in the display output.

6. The method of claim 1 wherein generating the display output comprises processing the echo information, the electronic chart information, and the AIS information to generate the display output, the electronic chart information comprising vector chart information.

7. The method of claim 1, wherein the at least one input comprises:

dilation offset information for at least one land area and the plurality of objects; and intertidal information for the at least one land area.

8. The method of claim 7, further comprising generating the display output by adjusting the dilation of the plurality of objects and the land area, based at least on the dilation offset information.

9. The method of claim 7, further comprising generating the display output based at least on the intertidal information.

10. The method of claim 1, wherein the at least one display parameter comprises at least one display range of the RADAR apparatus.

11. A Radio Detecting and Ranging (RADAR) apparatus for generating echo images, comprising:

a RADAR antenna configured to receive echo information of a plurality of electromagnetic waves at a vessel, from a plurality of objects, wherein the plurality of objects comprises at least one land object, at least one Automatic Identification System (AIS), and at least one floating object;

an AIS receiver configured to receive AIS information from the at least one AIS;

a smart RADAR comprising one or more processors, the smart RADAR communicably coupled to the RADAR antenna and the AIS receiver, and the one or more processors configured to extract electronic chart information from a storage module, wherein the electronic chart information is pre-stored in the storage module by a user;

a user interface associated with the smart RADAR, the user interface configured to receive at least one input from the user, the at least one input comprising mask information of the plurality of objects, wherein the one or more processors are further configured to:

generate a display output based at least on the echo information, the electronic chart information, and the AIS information;

apply the mask information comprising at least one mask to the plurality of objects in the display output; and automatically apply dilation of the at least one mask on the display output based at least on at least one display parameter set by the user; and a display communicably coupled to the smart RADAR, and configured to display the display output with the at least one mask and the dilation, to identify at least one unknown object from the plurality of objects.

12. The RADAR apparatus of claim 11, wherein the user interface is further configured to receive the mask information by accepting at least one of:

first mask information representing the at least one land object;

second mask information representing the at least one AIS; and third mask information representing the at least one floating object.

13. The RADAR apparatus of claim 12, wherein the first mask information comprises first color information, first transparent information, and erase information of the at least one land area displayed in the display output.

14. The RADAR apparatus of claim 12, wherein the second mask information comprises second color information, and second transparent information of the at least one AIS displayed in the display output.

15. The RADAR apparatus of claim 12, wherein the third mask information comprises third color information, and third transparent information of the at least one floating object displayed in the display output.

16. The RADAR apparatus of claim 11, wherein the one or more processors are further configured to generate the display output by processing the echo information, the electronic chart information, and the AIS information, the electronic chart information comprising vector chart information.

17. The RADAR apparatus of claim 11, wherein the user interface is further configured to receive:

dilation offset information for at least one land area and the plurality of objects; and intertidal information for the at least one land area.

18. The RADAR apparatus of claim 17, wherein the one or more processors are further configured to generate the display output by adjusting the dilation of the plurality of objects and the land area, based at least on the dilation offset information.

19. The RADAR apparatus of claim 17, wherein the one or more processors are further configured to generate, the display output based at least on the intertidal information.

20. The RADAR apparatus of claim 11, wherein the at least one display parameter comprises at least one display range.

* * * * *